Patented Aug. 4, 1953

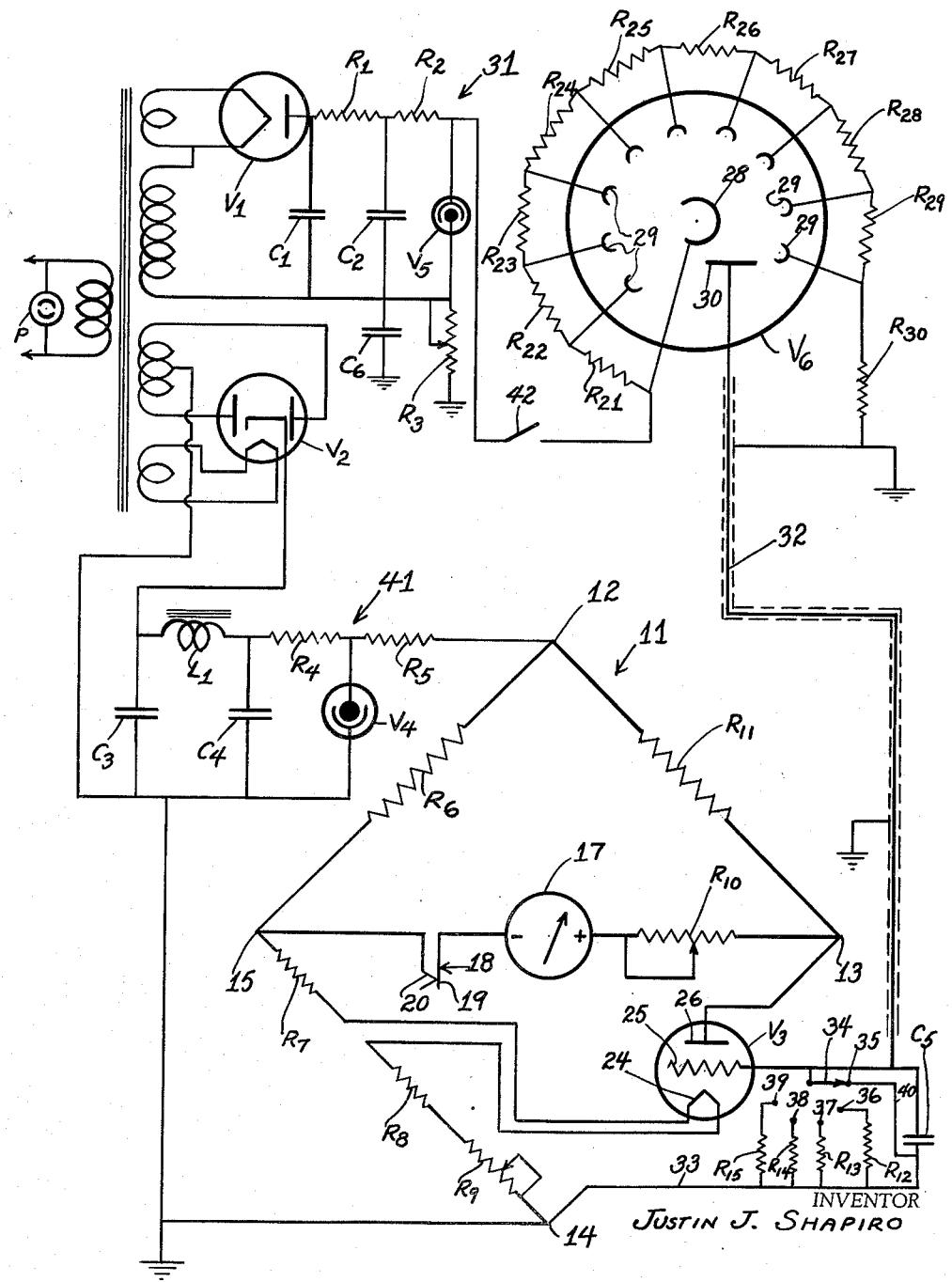

2,647,436

UNITED STATES PATENT OFFICE 2,647,436

ELECTRONIC PHOTOMETER

Justin J. Shapiro, Hyattsville, Md., assignor to American Instrument Company, Inc., Silver Spring, Md.

Application April 11, 1950, Serial No. 155,237

14 Claims. (Cl. 88—23)

This invention relates to photometers, and more particularly to a photometer of the electronic type.

A main object of the invention is to provide a novel and improved electronic photometer which is very simple in construction, which is very stable in operation, and which may be adjusted to provide a full scale reading for any reference intensity of light and which includes means for directly measuring an unknown light intensity in terms of a percentage, or decimal multiple of a percentage, of the reference intensity.

A further object of the invention is to provide an improved electronic photometer having a very high sensitivity, having means for reading and balancing out dark current, being very sturdy in construction, and which cannot be damaged by improper manipulation of its controls.

A still further object of the invention is to provide a readily portable, highly sensitive photometer which can be operated from the usual alternating current power lines without the need for batteries, the usefulness of the photometer being unaffected by fluctuations in supply line voltage.

A still further object of the invention is to provide an electronic photometer of improved construction wherein a very accurate comparison of two light intensities may be made directly in a decimal system, said photometer employing a circuit providing a high level output proportional to the intensity of the light being measured, and being suitable for directly operating control devices or for operating a recorder, the circuit being of the type employing a phototube and a meter, and being arranged so that both the photo-tube and the meter are protected against high currents, whereby no damage can be done to these or to other components of the circuit by improper manipulation of the controls or by exposing the photo-tube to excessive intensity of light.

Further objects and advantages of the invention will become apparent from the following description and claims, and from the accompanying drawing, wherein the single figure is a schematic wiring diagram of an electronic photometer constructed in accordance with the present invention.

Referring to the drawing, 11 generally designates a Wheatstone bridge having the four junctions designated respectively at 12, 13, 14 and 15. Junctions 12 and 14 are the input terminals, across which a constant D. C. potential is applied, as will be subsequently explained. The input terminal 14 is grounded, as shown. Terminals 13 and 15 are the output terminals of the bridge. Connected in series between the output terminals 13 and 15, as shown, are a variable resistor $R_{10}$, a meter 17, and a jack 18, said jack being conventional in structure and being of the type providing normally closed contacts 19 and 20 which may at times receive between them a suitable plug, not shown, for connecting a recorder or other device in series with the meter 17 and variable resistor $R_{10}$.

Connected between terminals 12 and 15 is a constant-value resistance arm $R_6$, and connected between terminals 12 and 13 is another constant-value resistance arm $R_{11}$.

Designated at $V_3$ is an amplifier tube having a filament 24, a grid 25, and a plate 26. Plate 26 is connected to the bridge junction 13. Connected in series between junctions 15 and 14 are a resistor $R_7$, the filament 24, a resistor $R_8$, and a variable resistor $R_9$.

Designated at $V_6$ is a photomultiplier tube, which may be, for example, an RCA type 931A tube. As will be understood by those skilled in the art, tube $V_6$ comprises a photo-emissive cathode 28, a plurality of multiplier elements or dynodes 29, and an anode 30. Dynodes 29 are nine in number and are so arranged that electrons emitted by cathode 28 successively strike each of the dynodes at a higher potential, releasing an increasing number of electrons therefrom, so that the output current of anode 30 is enormously multiplied as compared with that of a simple photo-emissive photo-tube.

Graduated potentials are applied to the elements of tube $V_6$. As shown in the drawing, these potentials are obtained from a constant-voltage direct current source 31, through the medium of serially connected voltage divider resistances $R_{21}$ to $R_{30}$. Cathode 28 is connected to the negative terminal of the direct current source 31 through a disconnect switch 42, as shown, and the dynodes 29 are respectively connected in the manner shown, so that the dynode 29 connected to the junction of resistances $R_{29}$ and $R_{30}$ is at the highest potential of the dynodes and is positive with respect to cathode 28, at the lowest potential, other dynodes being connected to successive junctions of the resistances so as to be at increasingly higher positive potentials, going clockwise in the drawing. The last voltage divider resistance $R_{30}$ is connected between the last dynode 29 clockwise and ground, providing a positive potential between anode 30 and the dynode 29 at highest potential.

Anode 30 of the photomultiplier tube is connected by a shielded wire 32 to the grid 25 of amplifier tube $V_3$. A by-pass condenser $C_5$ is connected between grid 25 and the ground wire 33, which is connected to the grounded terminal 14 of the bridge 11. Designated at 34 is a rotatable switch pole arranged to selectively engage contacts shown at 35 to 39. Contact 35 is connected by a wire 40 to the ground wire 33. Connected between the respective contacts 36 to 39 and the ground wire 33 are the respective multiplier decade resistors $R_{12}$ to $R_{15}$, the resistor $R_{13}$ being ten times the value of the resistor $R_{12}$, the resistor $R_{14}$ being ten times the value of the resistor $R_{13}$, and the resistor $R_{15}$ being ten times the value of the resistor $R_{14}$.

Designated generally at 41 is a constant-voltage D. C. source, connected between the input terminals 12 and 14 of the bridge 11.

From the drawing it will be seen that the Wheatstone bridge arm between terminals 13 and 14 comprises the effective plate resistance of tube $V_3$, and that an unbalance of the bridge will be caused by any change in the effective resistance of tube $V_3$. The values of resistors $R_7$, $R_8$ and $R_9$ are so chosen that the current through the meter 17 (as indicated on its scale) is precisely proportional to the current flowing in the particular resistor $R_{12}$, $R_{13}$, $R_{14}$ or $R_{15}$ selected by the rotatable switch pole 34. Thus, by proper choice of circuit values, particularly $R_{12}$ through $R_{15}$, the meter 17 may read precisely the microamperes of the photomultiplier tube output current. When the switch arm 34 is in engagement with contact 35, grid 25 is connected to ground, but said grid cannot go positive with respect to filament 24 because of the connection of resistors $R_9$ and $R_8$ between terminal 14 and filament 24. Under these conditions, the anode current of the photomultiplier tube $V_6$ cannot affect the potential of grid 25, since said anode current produces no voltage drop between said grid and ground. However, when the switch arm 34 is in engagement with any one of the contacts 36 to 39, anode current of the photomultiplier tube will produce a voltage drop between grid 25 and ground which will cause the tube $V_3$ to exhibit an effective plate resistance whose value depends on the magnitude of the anode current of the photomultiplier tube and the selected resistor $R_{12}$ to $R_{15}$, since the effective plate resistance depends on the potential on grid 25.

The bridge 11 may be initially balanced, with switch arm 34 engaging contact 35, by adjusting the variable resistor $R_9$ until a zero or null reading is obtained on meter 17. If the switch arm 34 is then moved to engage one of the switch contacts, say, contact 36, and there is no light impinging on the photomultiplier tube cathode 28, the bridge will become slightly unbalanced by the "dark current" in the tube $V_6$, which produces a potential on the grid 25 of tube $V_3$, and thereby changes the effective plate resistance of said tube $V_3$. The variable resistor $R_9$ may be then again adjusted to balance out the effect of the "dark current" and to restore the null reading on the meter 17.

It will be noted that the adjustment of rheostat $R_9$ varies the current through the filament 24 of tube $V_3$ and hence varies the emissivity of the filament. However, as will be presently explained, this does not affect the accuracy of the comparison measurements made by the apparatus after the adjustment to compensate for "dark current" has been accomplished. The connection of the filament 24 in the resistance arm of the bridge between the terminals 15 and 14 provides a stabilizing factor, inasmuch as if the resistance of the filament 24 should increase, thereby increasing the resistance between terminals 14 and 15, the emissivity of the filament decreases, thereby increasing the effective plate resistance of tube $V_3$, and thereby substantially compensating for the increase in resistance between terminals 14 and 15. A converse compensating action will occur if the resistance of filament 24 should decrease. However, the main reason for connecting filament 24 in the manner illustrated in the drawing is to provide the biasing resistors $R_8$ and $R_9$ between filament 24 and ground, so as to maintain grid 25 at a negative potential with respect to said filament.

The same compensating action as described above in connection with changes in resistance of filament 24, occurs when the resistance values of resistors $R_7$, $R_8$ and $R_9$ tend to drift during use of the apparatus.

The meter 17 is provided with a scale calibrated in units from zero to 100.

In employing the apparatus to compare an unknown light intensity with a reference light intensity, the bridge is first balanced and the "dark current" is balanced out in the manner above described. The photomultiplier tube is then exposed to the reference intensity, with the switch arm 34 engaging one of the contacts 36 to 39. Where the unknown intensity is known to be smaller than the reference intensity and the reference intensity is of substantial magnitude, the switch arm 34 may, for example, be set in engagement with the contact 36. This produces a potential on grid 25 which substantially reduces the effective plate resistance of tube $V_3$, causing a degree of unbalance of the bridge which provides a substantial reading on the scale of meter 17. The variable resistance $R_{10}$ is then adjusted so that a full scale reading is indicated on the scale of meter 17, i. e., the meter needle indicates "100", corresponding to the reference light intensity. The photomultiplier tube is then exposed to the unknown light intensity. This produces another potential on grid 25 corresponding to the magnitude of the unknown light intensity, and changes the effective plate resistance of the tube $V_3$ accordingly, changing the degree of unbalance of the bridge and causing the meter 17 to provide a reading directly indicating the percentage of the unknown intensity as compared with the reference intensity. If the unknown intensity is very small as compared with the reference intensity, the switch arm 34 may be engaged with the contact 37 when the photomultiplier tube is exposed to the unknown intensity, whereby the meter 17 will indicate the value of the unknown intensity in tenths of a percent of the reference intensity. Similarly, the unknown intensity may be indicated in hundredths of a percent of the reference intensity by engaging switch arm 34 with contact 38, or in thousandths of a percent of the reference intensity by engaging the switch arm 34 with the contact 39.

Since the photomultiplier tube current is always proportional to the light intensity to which the photomultiplier tube is exposed, the negative voltage drop across any one of the resistors $R_{12}$ to $R_{15}$ will always be proportional to the light intensity and to the values of said resistors. Therefore, the negative potential on grid 25 will always be in direct proportion to the light intensity, regardless of which of the contacts 36 to 39 the switch arm 34 is engaged with. However, due to the presence of the bias resistors $R_8$ and $R_9$ and due to its increasing negative potential with increasing light, the grid 25 can never go positive, whereby the meter 17 and the tube $V_3$ cannot be damaged by exposing the photomultiplier tube $V_6$ to an excessive light intensity.

The photomultiplier tube is also protected against damage by exposure to excessive light intensity by the provision of current limiting resistors $R_1$, $R_2$ and $R_3$ in its power supply circuit and by the provision of the resistors $R_{21}$ to $R_{30}$ connected as shown. The meter 17 is protected against excessive current by the current limiting effect of resistors $R_{10}$ and $R_{11}$.

No damage can be done to any component by improper manipulation of the controls of the instrument, since grid 25 cannot be driven positive, and excessive light may merely cut off the current through tube $V_3$.

The apparatus may be employed to drive a suitable recorder, by connecting the recorder to the jack 18. The recorder may be of the type embodying a circular chart, whereby direct plots of angle light scattering may be made on polar cordinate paper, either manually or automatically by the use of a suitable mechanism coupling the chart with a rotatable apertured light gate associated with the photomultiplier tube.

It will be apparent from the foregoing that the unknown intensity being measured may be either greater or smaller than the reference intensity. The procedure in comparing a smaller unknown intensity with a greater reference intensity has been described above, and, depending on the magnitude of the reference intensity, the meter 17 may be set to give a full scale reading, corresponding to the reference intensity, with the switch arm 34 engaging any one of the contacts 36 to 39. The magnitude of the unknown intensity relative to the reference intensity may then be determined by setting the switch arm 34 to a position wherein the meter 17 indicates less than full scale deflection when the photomultiplier tube is exposed to the unknown intensity, even when the unknown intensity is much greater than the reference intensity, since the sensitivity of the apparatus may be controlled by the setting of the switch arm 34. Maximum sensitivity is obtained with the switch arm in engagement with contact 39 and minimum sensitivity is obtained with the switch arm in engagement with contact 36. Since the resistors $R_{12}$ to $R_{15}$ are in decade relation, the apparatus is one thousand times more sensitive with the switch arm engaging contact 39 than when the switch arm engages contact 36. Similarly, when the switch arm engages contact 38 the apparatus is one hundred times more sensitive, and when the switch arm engages contact 37 the apparatus is ten times more sensitive, than when said switch arm engages contact 36.

It will be seen that the range of sensitivity of the apparatus is so great that ratios of light intensities of the order of one to one million may be accurately determined.

In a typical design of the apparatus of the figure, the following values of the components were employed:

| | |
|---|---|
| $R_1$, $R_2$ | 3 megohms. |
| $R_3$ | 10 megohms (maximum). |
| $R_4$ | 5000 ohms. |
| $R_5$ | 4350 ohms. |
| $R_6$ | 150 ohms. |
| $R_7$ | 600 ohms. |
| $R_8$ | 100 ohms. |
| $R_9$ | 50 ohms (maximum). |
| $R_{10}$ | 20,000 ohms (maximum). |
| $R_{11}$ | 15,000 ohms. |
| $R_{12}$ | 100,000 ohms. |
| $R_{13}$ | 1 megohm. |
| $R_{14}$ | 10 megohms. |
| $R_{15}$ | 100 megohms. |
| $R_{21}$ to $R_{30}$ | 3 megohms each. |
| $V_1$ | Type 2X2A half wave rectifier. |
| $V_2$ | Type 6X4 full wave rectifier. |
| $V_3$ | Type CK5697. |
| $V_4$ | Type OB2 voltage regulator tube. |
| $V_5$ | Type 5841 voltage regulator tube. |
| $V_6$ | Type 931–A photomultiplier tube. |
| $C_6$ | .1 mfd. capacitor. |
| $C_5$ | .005 mfd. mica capacitor. |
| $C_1$, $C_2$ | .1 mfd. capacitor. |
| $C_3$, $C_4$ | 1.75 mfd. capacitor. |
| $L_1$ | 10 henry choke. |
| Meter 17 | 0–100 microamperes D. C. |
| P | Neon pilot lamp. |

The sensitivity of the amplifier makes it possible to use a voltage of the order of 900 volts across the photomultiplier tube instead of the maximum of 1250 volts across said tube for the largest values of light to dark currents.

While a specific embodiment of an electronic photometer has been disclosed in the foregoing description, it will be understood that various modifications within the spirit of the invention may occur to those skilled in the art. Therefore it is intended that no limitation be placed on the invention except as defined by the scope of the appended claims.

What is claimed is:

1. An electronic photometer comprising a bridge circuit including a vacuum tube connected in one of its arms, a meter connected to said bridge circuit and being arranged to indicate the degree of unbalance of the bridge circuit, a variable resistance in series with said meter, a photomultiplier tube, a load resistor connecting the control grid of said vacuum tube to one of the terminals of the bridge circuit, a source of direct current, and circuit means connecting said source to said load resistor through the cathode-anode circuit of the photomultiplier tube, whereby the potential on said grid is governed by the photo-emission of the photomultiplier tube, the filament of the vacuum tube being connected in series with another arm of the bridge circuit.

2. An electronic photometer comprising a bridge circuit including a vacuum tube connected in one of its arms, a meter connected to said bridge circuit and being arranged to indicate the degree of unbalance of the bridge circuit, a variable resistance in series with said meter, a photomultiplier tube, a load resistor connecting the control grid of said vacuum tube to one of the terminals of the bridge circuit, a source of direct current, and circuit means connecting said source to said load resistor through the cathode-anode circuit of the photomultiplier tube, whereby the potential on said grid is governed by the photo-emission of the photomultiplier tube, the cathode of said vacuum tube comprising a filament connected into the intermediate portion of another arm of the bridge circuit and being arranged so that a portion of said another arm acts as a biasing means for the vacuum tube.

3. An electronic photometer comprising a Wheatstone bridge circuit including a vacuum tube in one of its arms, the plate of said tube being connected to one of the output terminals of the bridge circuit and the cathode of the tube being connected in series with another arm of the bridge circuit, a portion of said another arm being connected between said cathode and an input terminal of the bridge circuit and being arranged to provide a bias on the tube, a meter connected across the output terminals of the bridge circuit and being arranged to indicate the degree of unbalance thereof, a first source of current connected to the input terminals of the bridge circuit, a load resistor connecting the control grid of the vacuum tube and said first-mentioned input terminal, a photomultiplier tube, a second source of current, and circuit means connecting said second source of current to said load resistor through the cathode-anode circuit of the photomultiplier tube, whereby the potential on said control grid is governed by the photo-emission of the photomultiplier tube.

4. An electronic photometer comprising a Wheatstone bridge circuit including a vacuum tube in one of its arms, the plate of said tube being connected to one of the output terminals of the bridge circuit and the cathode of the tube comprising a filament connected in series with another arm of the bridge circuit, a portion of said another arm being connected between said cathode and an input terminal of the bridge circuit and being arranged to provide a bias on the tube, said portion including a first variable resistor, a meter connected across the output terminals of the bridge circuit and arranged to indicate the degree of unbalance thereof, a first source of current connected to the input terminals of the bridge circuit, a second variable resistor connected between the control grid of the vacuum tube and said first-mentioned input terminal, a photomultiplier tube, a second source of current, and circuit means connecting said second source of current to said second variable resistor through the cathode-anode circuit of the photomultiplier tube, whereby the potential on said control grid is governed by the photo-emission of the photomultiplier tube.

5. An electronic photometer comprising a Wheatstone bridge circuit including a vacuum tube in one of its arms, the plate of said tube being connected to one of the output terminals of the bridge circuit and the cathode of the tube comprising a filament connected in series with another arm of the bridge circuit, a portion of said another arm being connected between the cathode and an input terminal of the bridge circuit and being arranged to provide a bias on the tube, said portion including a first variable resistor, indicating means connected across the output terminals of the bridge circuit and being arranged to indicate the degree of unbalance thereof, said indicating means comprising a meter and a second variable resistor connected in series therewith, a first source of current connected to the input terminals of the bridge circuit, a plurality of load resistors, means arranged to selectively connect said load resistors between the control grid of the vacuum tube and said first-mentioned input terminal, a photomultiplier tube, a second source of current, and circuit means connecting said second source of current to said control grid through the cathode-anode circuit of the photomultiplier tube, whereby the potential on said control grid is governed by the photo-emission of the photomultiplier tube.

6. An electronic photometer comprising a Wheatstone bridge circuit including a vacuum tube in one of its arms, the plate of said tube being connected to one of the output terminals of the bridge circuit and the cathode of the tube comprising a filament connected in series with another arm of the bridge circuit, a portion of said another arm being connected between the cathode and an input terminal of the bridge circuit and being arranged to provide a bias on the tube, said portion including a first variable resistor, indicating means connected across the output terminals of the bridge circuit and being arranged to indicate the degree of unbalance thereof, said indicating means comprising a meter and a second variable resistor connected in series therewith, a first source of current connected to the input terminals of the bridge circuit, a plurality of load resistors, the values of said load resistors being in decade relation to each other, switch means arranged to selectively connect said load resistors between the control grid of the vacuum tube and said first-mentioned input terminal and being arranged to connect the control grid directly to said first-mentioned input terminal at times, a photomultiplier tube, a second source of current, and circuit means connecting said second source of current to said control grid through the cathode-anode circuit of the photomultiplier tube, whereby the potential on said control grid is governed by the photo-emission of the photomultiplier tube when any one of said load resistors is connected between said control grid and said first-mentioned input terminal.

7. An electronic photometer comprising a bridge circuit including a vacuum tube connected in one of its arms, a meter connected to said bridge circuit and arranged to indicate the degree of unbalance thereof, a photo-tube, a load resistor connecting the control grid of said vacuum tube to one of the terminals of the bridge circuit, a source of direct current, and circuit means connecting said source to said load resistor through the cathode-anode circuit of the photo-tube, whereby the potential on said grid is governed by the photo-emission of the photo-tube, the filament of the vacuum tube being connected in series with another arm of the bridge circuit and being arranged so that changes in resistance of the filament produce compensating changes in resistance of said one arm.

8. An electronic photometer comprising a bridge circuit including a vacuum tube connected in one of its arms, a meter connected to said bridge circuit and arranged to indicate the degree of unbalance thereof, a photo-tube, a load resistor connecting the control grid of said vacuum tube to one of the terminals of the bridge circuit, a source of direct current, and circuit means connecting said source to said load resistor through the cathode-anode circuit of the photo-tube, whereby the potential on said grid is governed by the photo-emission of the photo-tube, the filament of the vacuum tube being connected in another arm of the bridge circuit and a portion of said another arm being connected between said filament and said one of the terminals of the bridge circuit and being arranged to provide a bias on the vacuum tube.

9. An electronic photometer comprising a bridge circuit including a vacuum tube connected in one of its arms, a meter connected to said bridge circuit and arranged to indicate the degree of unbalance thereof, a photo-tube, a load resistor connecting the control grid of said vacuum tube to one of the terminals of the bridge circuit, a source of direct current, and circuit means connecting said source to said load resistor through the cathode-anode circuit of the photo-tube, whereby the potential on said grid is governed by the photo-emission of the photo-tube, the filament of the vacuum tube being connected in another arm of the bridge circuit, a portion of said another arm being connected between said filament and said one of the terminals of the bridge circuit and being arranged to provide a bias on the tube, and said filament being arranged so that changes in resistance of the filament produce compensating changes in the resistance of said one arm.

10. An electronic photometer comprising a bridge circuit including a vacuum tube connected in one of its arms, a meter connected to said bridge circuit and arranged to indicate the degree of unbalance thereof, a photo-tube, a load resistor connecting the control grid of said vacuum tube to one of the terminals of the bridge circuit, a source of direct current, and circuit means connecting said source to said load resistor through the cathode-anode circuit of the photo-tube, whereby the potential on said grid is governed by the photo-emission of the photo-tube, the cathode of the vacuum tube being connected to another arm of the bridge circuit and a portion of said another arm being arranged to provide a bias on the vacuum tube.

11. An electronic photometer comprising a bridge circuit including a vacuum tube connected in one of its arms, a meter connected to said bridge circuit and arranged to indicate the degree of unbalance thereof, a photo-tube, a load resistor connecting the control grid of said vacuum tube to one of the terminals of the bridge circuit, a source of direct current, and circuit means connecting said source to said load resistor through the cathode-anode circuit of the photo-tube, whereby the potential on said grid is governed by the photo-emission of the photo-tube, the cathode of the vacuum tube being connected to another arm of the bridge circuit and a portion of said another arm being connected between said cathode and said one of the terminals of the bridge circuit and being arranged to provide a bias on the vacuum tube.

12. An electronic photometer comprising a bridge circuit including a single vacuum tube connected in one of its arms, a meter connected to said bridge circuit and being arranged to indicate the degree of unbalance of the bridge circuit, a photo-tube, a load resistor connecting the control grid of said vacuum tube to one of the terminals of the bridge circuit, a source of direct current, circuit means connecting said source to said load resistor through the cathode-anode circuit of the photo-tube, whereby the potential on said grid is governed by the photo-emission of the photo-tube, and circuit means connecting the filament of the vacuum tube in series with another arm of the bridge circuit, whereby variations in resistance of the filament provide compensatory variations in the effective plate resistance of the vacuum tube.

13. An electronic photometer comprising a bridge circuit including a single vacuum tube having a filament, a control grid, and a plate, circuit means connecting the grid and plate to one of the arms and including a load resistor connected between the grid and one terminal of the bridge circuit, a meter connected to said bridge circuit and being arranged to indicate the degree of unbalance of the bridge circuit, a photo-tube, a source of direct current, circuit means connecting said source to said load resistor through the cathode-anode circuit of the photo-tube, whereby the potential on said grid is governed by the photo-emission of the photo-tube, and circuit means connecting the filament of the vacuum tube in series with another arm of the bridge circuit and being arranged so that variations in resistance of the filament provide compensatory variations in the effective plate resistance of the vacuum tube.

14. An electronic photometer comprising a bridge circuit including a single vacuum tube having a filamentary cathode, a control grid and a plate, circuit means connecting the grid and plate to one of the arms of the bridge circuit and including a load resistor connected between the grid and one terminal of said bridge circuit, a meter connected to said bridge circuit and being arranged to indicate the degree of unbalance of the bridge circuit, a photo-tube, a source of direct current, circuit means connecting said source to said load resistor through the cathode-anode circuit of the photo-tube, whereby the potential on said grid is governed by the photo-emission of the photo-tube, and circuit means connecting the filamentary cathode in series with another arm of the bridge circuit and being arranged so that variations in resistance of said cathode provide compensatory variations in the effective plate resistance of the vacuum tube.

JUSTIN J. SHAPIRO.

References Cited in the file of this patent

UNITED STATES PATENTS

| Number | Name | Date |
| --- | --- | --- |
| 2,219,928 | Kalmus | Oct. 29, 1940 |
| 2,228,868 | Briebrecher | Jan. 14, 1941 |
| 2,269,813 | Garity et al. | Jan. 13, 1942 |
| 2,407,564 | Martin et al. | Sept. 10, 1946 |
| 2,417,023 | Sweet | Mar. 4, 1947 |
| 2,457,289 | Warnick | Dec. 28, 1948 |
| 2,510,347 | Perkins | June 6, 1950 |